Oct. 29, 1968     L. F. SCHMID     3,407,907

AUXILIARY BRAKE MECHANISM AND ACTUATOR FOR DISK BRAKES

Filed July 25, 1966     2 Sheets-Sheet 1

INVENTOR.
Leopold F. Schmid

BY

Ross & Masbern

Leopold F. Schmid
INVENTOR.

BY Ross & Mestern

United States Patent Office 3,407,907
Patented Oct. 29, 1968

3,407,907
AUXILIARY BRAKE MECHANISM AND
ACTUATOR FOR DISK BRAKES
Leopold Franz Schmid, Stuttgart, Germany, assignor to
Alfred Teves G.m.b.H., Frankfurt am Main, Germany,
a corporation of Germany
Filed July 25, 1966, Ser. No. 567,740
Claims priority, application Germany, Aug. 6, 1965,
Sch 37,509
4 Claims. (Cl. 188—73)

ABSTRACT OF THE DISCLOSURE

Disk brake in which an auxiliary actuating mechanism bears upon the main brake shoes or auxiliary brake shoes on opposite sides of the disk through a rocker member which distributes the actuating force upon these brake shoes through a rod acting upon one brake shoe and through a train of rods and balls acting upon the other brake shoe and traversing a J-shaped channel open toward the second brake shoe and the rocker member.

---

My present invention relates to an auxiliary braking mechanism for actuating disk-type brakes and, more particularly, to a hand-brake arrangement operable with disk-brake systems.

In automotive vehicles and the like, it is common practice to provide auxiliary actuating devices for one or more wheel brakes for use in parking the vehicle and for emergency operation of the brake system in the event of failure of the normal hydraulic system. Such auxiliary actuating systems are commonly known as "hand brakes" since they are often actuated by a lever shiftable by the hand of the operator of the vehicle. It will be understood, however, that reference hereinafter to a "hand-brake" system is intended to include other means of actuating such auxiliary systems, namely, pedals, levers or the like which may or may not be operated directly by hand. Present systems generally make use of auxiliary actuating devices for drum-type brakes whereby a cable or other force-transmitting mechanism swings a lever which, in turn, bears upon one or both shoes of one of the internal-expanding brake arrangements at a rear wheel of the automotive vehicle. Similar lever arrangements cannot be employed effectively with disk-type brakes wherein the brake shoes are shiftable in or with respective yoke-type support arrangements in a direction perpendicular to the braking surface of the disk and parallel to its axis of rotation. In fact, efforts have been made to apply lever systems of this nature to disk brakes, but it has been found that they invariably tend to become relatively complex and expensive and are endangered by contamination with water or dirt, etc. Another disadvantage is that the conventional lever systems require considerable space and thus complicate the difficulties in keeping the region of the disk brakes free from mechanical defects.

It is, therefore, the principal object of the present invention to provide an auxiliary actuating mechanism for a disk-brake system corresponding to the hand brakes or emergency brakes of automotive vehicles.

A further object of this invention is to provide an auxiliary actuating system for a disk brake which does not require significant space in the region of the braking mechanism, which is relatively inexpensive and simple, and which is free from the danger of contamination by dirt of water.

I have found that these objects and others which will become apparent hereinafter can be attained by providing in combination with a disk brake comprising a pair of brake shoes displaceable perpendicularly to the braking surface of a disk and disposed on opposite sides thereof, a loop or bent channel (e.g., of U-shaped configuration) open at one end in the direction of one of the brake shoes and having its other end open toward the other side of the disk (e.g., in the region of the other brake shoe), the auxiliary actuating mechanism including a member acting directly upon this latter brake shoe and a compression-resistant force-transmitting means running through this channel to bear upon the first-mentioned brake shoe. The channel, which is sealed from the ambient environment, advantageously encloses a plurality of compression-resistant balls forming part of the above-mentioned force-transmitting means and extending around the bight of the channel to bear directly or via a pin or the like against the first-mentioned brake shoe. The actuating force can be transmitted to the balls via a further pin extending parallel to the axis of the disk and thus perpendicularly to the braking surface thereof. A pair of force-transmitting pins may, of course, be provided, one of these pins serving to transmit motion to the balls while the other bears directly against the brake shoe along the side of the brake support at which the lever mechanism of the actuating device is located. Thus the U-shaped channel is constituted as a tube along which the balls can be displaced with limited play in the radial direction but freely in the longitudinal sense.

The above and other objects, features and advantages of the present invention will become more readily apparent from the following description, reference being made to the accompanying drawing in which.

Figure 1:
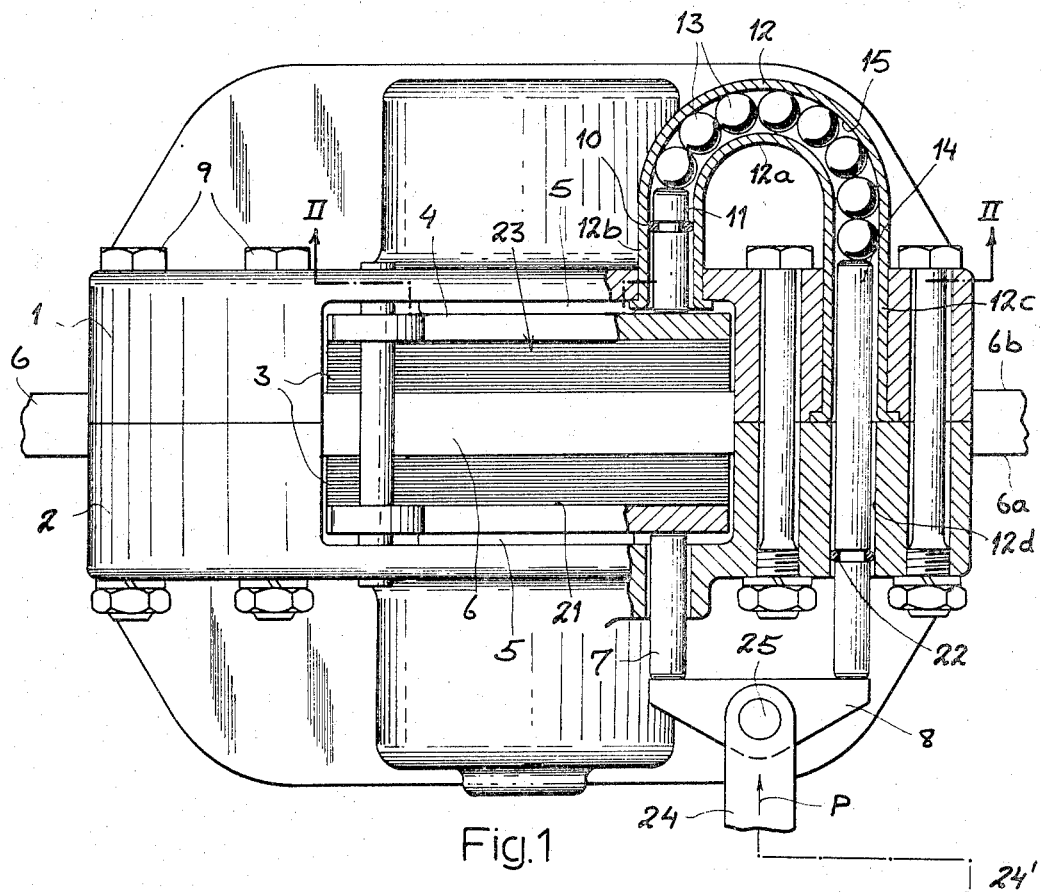
FIG. 1 is a plan view of a portion of a disk-brake assembly, partly broken away, illustrating an auxiliary actuating mechanism in accordance with the present invention.
Figure 2:
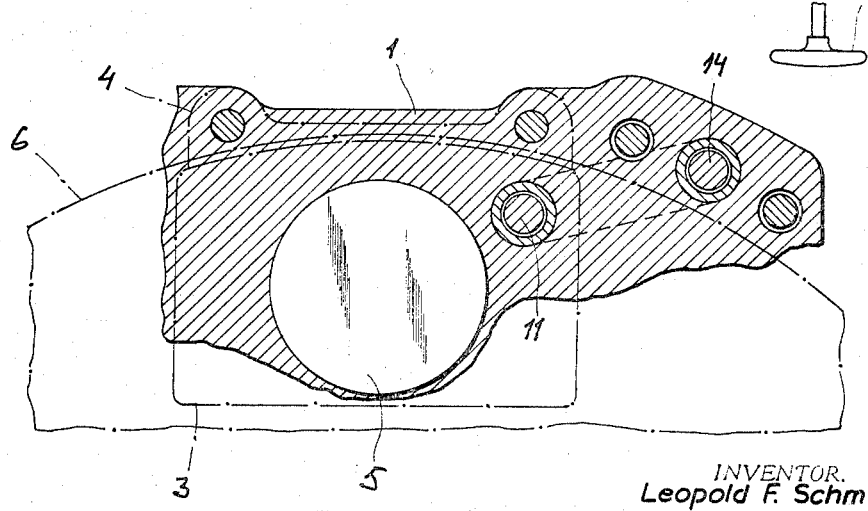
FIG. 2 is a cross-sectional view taken along the line II—II of FIG. 1.

In FIGS. 1 and 2 of the drawing, I show a disk brake whose fixed yoke is constituted by an inner half 1 and an outer half 2 joined together by bolts 9. The yoke brackets both braking faces of a disk 6 and serves to support a pair of brake shoes 21 and 23 for displacement perpendicularly to the braking faces 6a and 6b of the disk. Each of these brake shoes comprises a backing plate 4 and a lining 3 frictionally engageable with the respective face of the disk. For actuation of the brake shoes 3, 4, there are provided a pair of hydraulic cylinders generally shown at 5 and energizable by a conventional hydraulic system to force the respective brake shoes against the disk 6.

The yoke half 1 is provided with a bent J-shaped tube 12 filled with grease and containing a multiplicity of compression-resistant roller elements (e.g., balls) 13 whose diameter is only slightly smaller than the diameter of the bore 15 of the tube, the mutually abutting balls 13 being freely movable about the bight 12a of the tube without jamming or locking. At one end 12b of the tube 12, open in the direction of the brake shoe 23 remote from the actuating lever or arm 24, I provide a pin 11 whose O-ring 10 engages the wall of this extremity 12b of the tube 12 to prevent leakage of grease from the interior 15 thereof or entry of dirt into the tube. The pin 11 acts directly upon the brake shoe 23 via its backing plate 4. Force is applied to the balls 13 and transferred thereby to the pin 11 via a further pin 14 which is slidably received in the other end 12c of the tube. The shank 12c of tube 12 registers with a bore 12d in yoke half 2 so that in effect the tube 12 opens at the side of the yoke at which the actuating arm 24 is provided. Pin 14 traversing a bore 12d aligned with the tube section 12c, is provided with an O-ring 22 preventing entry of contaminants into the tube from its other end. A pin 7 also bears upon the backing plate 4 of the brake shoe 21 on the side of the yoke proximal to the actuating member 24. A force-equalizing lever 8 is constituted as a butterfly pivoted via a pin 25 onto the actuating arm 24 so that application of hand-brake pressure (from actuating handle 24′) in the direction of arrow P will urge pins 7 and 14 upward (FIG. 1) and thereby advance both brake shoes against the disk 6. It will be apparent that the balls 13 here constitute a substantially incompressible force-transmitting medium capable of extending conveniently around an arc to change the effective direction of force supplied without involving complex lever linkages or the like.

Figure 3:
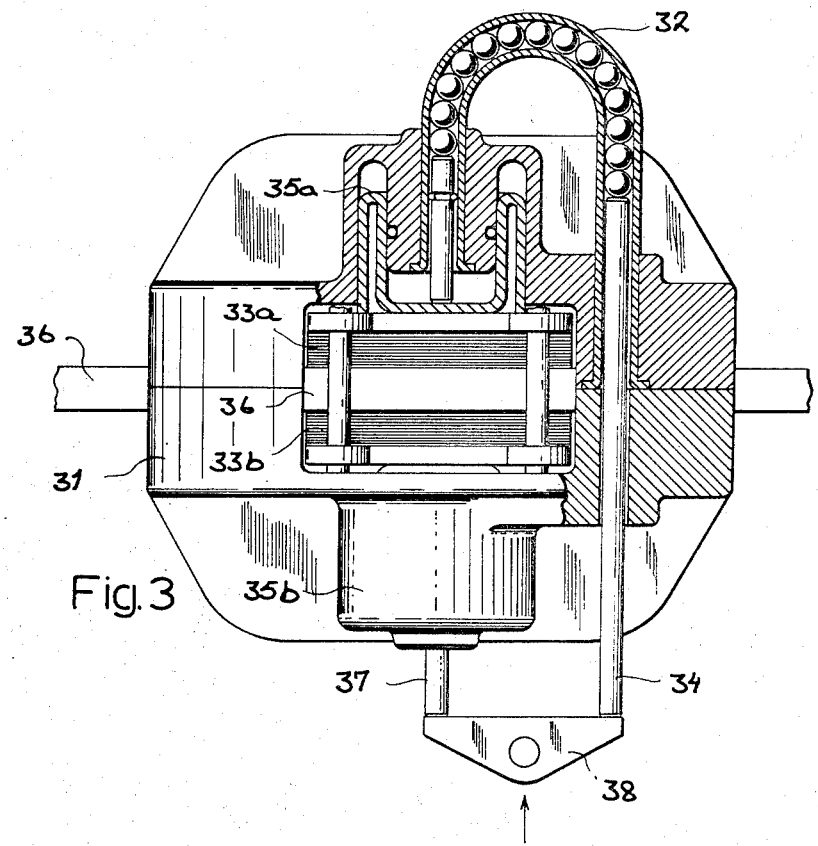
FIG. 3 is an elevational view illustrating a modified embodiment in which the auxiliary actuating mechanism acts upon the hydraulic member of one of the brake shoes.
Figure 4:
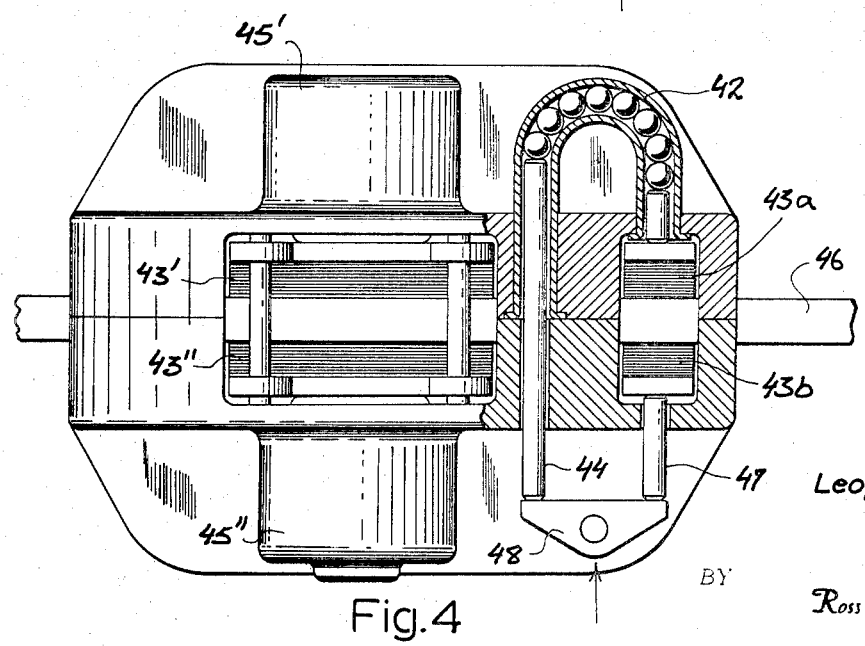
FIG. 4 is a similar view of still another modification.

As illustrated in FIGS. 3 and 4, the basic system shown in FIGS. 1 and 2 can be modified in various structural details. Thus, in FIG. 3, the hydraulic devices 35a and 35b on opposite sides of the yoke 31 extending over the edges of the disk 36 act upon respective brake shoes 33a and 33b. Here, the hand-brake auxiliary actuating device acts directly upon the hydraulic members equivalent to those shown at 5 in FIG. 1. Thus a pin 37 bears upon the hydraulic member of cylinder 35b and brake shoe 33b whereas a pin similar to that shown at 11 and a multiplicity of balls corresponding to those illustrated at 13 are applied within the tube 32 against the hydraulic member of cylinder 35a to shift the brake shoe 33a. Again an equalizing lever 38 is pivotally mounted upon the actuating bar and bears upon the pin 37 as well as upon a pin 34 in force-transmitting relationship with the balls within the tube 32.

In the system of FIG. 4, the pin 44 acts upon the balls within the bent tube 42 whereupon these balls apply pressure via a pin corresponding to that shown at 11 to an auxiliary brake shoe 43a axially shiftable against the disk 46. The other pin 47, upon which the pivoting force-equalizing rocker arm 48 bears, acts upon the brake shoe 43b engageable with the other side of the disk 46. The auxiliary brake shoes 43a and 43b are provided independently of primary brake shoes 43′ and 43″ which are actuatable by conventional hydraulic devices 45′ and 45″ to generate the primary braking force. Brake shoes 43a, 43′ and 43b, 43″ constitute respective brake-shoe means confronting opposite sides of brake disk 46.

The invention as described and illustrated is believed to admit of many modifications which will be readily apparent to those skilled in the art and such modifications are intended to be included within the spirit and scope of the appended claims.

I claim:
1. A disk-brake system comprising a brake disk, a yoke spanning the periphery of said disk, first and second brake-shoe means confrontingly mounted on said yoke for relative movement toward opposite faces of said disk, and operating means for displacing said first and second brake-shoe means toward said disk, the improvement wherein said operating means includes a pressure member on one side of said disk, a rigid element disposed between said first brake-shoe means and said pressure member for transmitting a force from said member to said first brake-shoe means, said yoke means being provided with a bent channel open at one end toward said pressure member and at the other end toward said second brake-shoe means, and pressure-transmitting means in said channel displaceable by said pressure member for exerting upon said second brake-shoe means a force opposite in direction to the force exerted upon said first brake-shoe means by way of said rigid element, said pressure member comprising a rocker bearing at one point upon said rigid element and at another point upon said pressure-transmitting means, said actuating means including mechanism for exerting an external force upon said rocker at a location substantially midway between said points.

2. A disk-brake system comprising a brake disk, a yoke spanning the periphery of said disk, first and second brake-shoe means confrontingly mounted on said yoke for relative movement toward opposite faces of said disk, and operating means for displacing said first and second-brake-shoe means toward said disk, the improvement wherein said operating means includes a pressure member on one side of said disk, a rigid element disposed between said first brake-shoe means and said pressure member for transmitting a force from said member to said first brake-shoe means, said yoke means being provided with a generally J-shaped channel open at one end toward said pressure member and at the other end toward said second brake-shoe means, and pressure transmitting means in said channel displaceable by said pressure member for exerting upon said second brake-shoe means a force opposite in direction to the force exerted upon said first brake-shoe means by way of said rigid element, said pressure member comprising a rocker bearing at one point upon said rigid element and at another point upon said pressure-transmitting means, said actuating means including mechanism for exerting an external force upon said rocker at a location substantially midway between said point, said channel having a bight portion on the side of said disk remote from said pressure member, said pressure-transmitting means including a set of balls abuttingly disposed in said bight portion.

3. The improvement defined in claim 2 wherein said operating means includes a pair of hydraulic pistons bearing directly upon said first and second brake-shoe means, and force-exerting mechanism bearing upon said pressure member independently of said pistons.

4. The improvement defined in claim 3 wherein said rigid element and said pressure-transmitting means bear upon said first and second brake-shoe means through the intermediary of said hydraulic pistons.

References Cited
UNITED STATES PATENTS
| | | | |
|---|---|---|---|
| 2,790,516 | 4/1957 | Wright | 188—73 |
| 2,820,529 | 1/1958 | Tack | 188—73 X |
| 3,156,325 | 11/1964 | Taylor | 188—73 |
| 3,244,260 | 4/1966 | Frayer | 188—106 X |

FOREIGN PATENTS
| | | |
|---|---|---|
| 860,447 | 9/1940 | France. |
| 219,506 | 7/1924 | Great Britain. |

MILTON BUCHLER, *Primary Examiner.*

G. E. HALVOSA, *Assistant Examiner.*